(12) United States Patent
Greenberger et al.

(10) Patent No.: US 9,892,453 B1
(45) Date of Patent: Feb. 13, 2018

(54) AUTOMATED PRODUCT MODELING FROM SOCIAL NETWORK CONTACTS

(71) Applicant: INTERNATIONAL BUSINESS MACHINES CORPORATION, Armonk, NY (US)

(72) Inventors: Jeremy A. Greenberger, Raleigh, NC (US); Zachary M. Greenberger, Raleigh, NC (US); Trudy L. Hewitt, Cary, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/334,401

(22) Filed: Oct. 26, 2016

(51) Int. Cl.
| | |
|---|---|
| G06Q 30/00 | (2012.01) |
| G06Q 30/06 | (2012.01) |
| H04L 29/08 | (2006.01) |
| H04L 12/24 | (2006.01) |
| H04L 12/58 | (2006.01) |
| G06Q 50/00 | (2012.01) |
| G06F 17/30 | (2006.01) |
| H04L 29/06 | (2006.01) |

(52) U.S. Cl.
CPC ... *G06Q 30/0643* (2013.01); *G06F 17/30265* (2013.01); *G06F 17/30864* (2013.01); *G06Q 50/01* (2013.01); *H04L 41/5009* (2013.01); *H04L 51/32* (2013.01); *H04L 67/10* (2013.01); *H04L 67/306* (2013.01); *H04L 67/02* (2013.01); *H04L 67/42* (2013.01)

(58) Field of Classification Search
CPC .................................................... G06Q 30/00
See application file for complete search history.

(56) References Cited

U.S. PATENT DOCUMENTS

| | | | |
|---|---|---|---|
| 8,626,602 B2 | 1/2014 | George | |
| 8,694,522 B1 * | 4/2014 | Pance | G06F 17/30867 707/706 |
| 9,251,395 B1 * | 2/2016 | Botchen | G06F 17/30247 |

(Continued)

OTHER PUBLICATIONS

ASAP54.com, London, Bianca, "Want what that stylish girl on the street is wearing? There's an app for that! 'Shazam of fashion finds clothes in a flash—and Cara Delevingne is a fan", The Daily Mail, dated Mar. 19, 2014 (Year: 2014).*

(Continued)

*Primary Examiner* — Mark A Fadok
(74) *Attorney, Agent, or Firm* — Patrick J. Daugherty; Driggs, Hogg, Daugherty & Del Zoppo Co., LPA (57) ABSTRACT

Aspects provide for automated modeling of products with user social network contacts. In response to a user selecting via a graphical user interface input a product that is offered in a graphic display device view of an electronic commerce web site, aspects search a social network service for pictures that visually depict social network connections of the user in association with the selected product. Aspects thus refresh the graphic display device to display an information page of the electronic commerce web site that provides information regarding the selected product, and an inset picture that depicts a social network connection of the user in association with the selected product, wherein the inset picture is returned in satisfaction of the searching of the social network connections of the user.

17 Claims, 4 Drawing Sheets

(56) References Cited

U.S. PATENT DOCUMENTS

| | | | |
|---|---|---|---|
| 9,342,748 B2 | 5/2016 | Boncyk et al. | |
| 9,360,945 B2 | 6/2016 | Boncyk et al. | |
| 2003/0023598 A1* | 1/2003 | Janakiraman | G06Q 30/02 |
| 2007/0019261 A1* | 1/2007 | Chu | G06Q 30/02 358/540 |
| 2007/0159522 A1* | 7/2007 | Neven | G06Q 30/02 348/14.02 |
| 2007/0168216 A1 | 7/2007 | Lemelson | |
| 2007/0172155 A1* | 7/2007 | Guckenberger | G06F 17/30247 382/305 |
| 2009/0123090 A1* | 5/2009 | Li | G06Q 30/02 382/305 |
| 2009/0228373 A1* | 9/2009 | Knighton | G06Q 30/0601 705/26.1 |
| 2010/0228558 A1* | 9/2010 | Corcoran | G06Q 30/02 705/1.1 |
| 2011/0082915 A1* | 4/2011 | Carr | H04N 21/25891 709/219 |
| 2012/0158961 A1 | 6/2012 | Cragun et al. | |
| 2012/0229909 A1* | 9/2012 | Clavin | G02B 27/017 359/630 |
| 2013/0227603 A1* | 8/2013 | Bosworth | G06F 17/3079 725/19 |
| 2014/0250128 A1* | 9/2014 | Akin | G06F 17/30554 707/740 |
| 2014/0279068 A1* | 9/2014 | Systrom | G06Q 30/0277 705/14.73 |
| 2014/0279289 A1 | 9/2014 | Steermann | |
| 2014/0358679 A1* | 12/2014 | Levinson | G06Q 30/0251 705/14.49 |
| 2014/0372228 A1* | 12/2014 | Paz-Pujalt | G06Q 30/0271 705/14.67 |
| 2015/0006301 A1* | 1/2015 | McMillion | G06Q 50/01 705/14.73 |
| 2015/0142585 A1* | 5/2015 | Scalise | G06Q 30/0277 705/14.73 |
| 2015/0193829 A1* | 7/2015 | Mukherjee | G06T 11/60 705/14.67 |
| 2015/0363660 A1* | 12/2015 | Vidal | G06F 17/30277 382/173 |
| 2016/0092732 A1* | 3/2016 | Black | G06K 9/00624 382/103 |
| 2016/0098783 A1* | 4/2016 | Margalit | G06Q 30/0635 705/26.5 |
| 2016/0203143 A1* | 7/2016 | Kritt | G06F 17/30696 707/722 |

OTHER PUBLICATIONS

Peter Mell et al, The NIST Definition of Cloud Computing, National Institute of Standards and Technology, Publication 800-145, 2011.

Kawaf et al, Online Shopping Environments in Fashion Shopping: An S-O-R based review, The Marketing Review, 2012.

Suraworachet et al, The study on the effect of Facebook's social network features toward intention to buy on F-commerce in Thailand, IEEE/IPSJ, 12th International Symposium on Applications and the Internet, 2012.

\* cited by examiner

AUTOMATED PRODUCT MODELING FROM SOCIAL NETWORK CONTACTS

BACKGROUND

Electronic commerce ("E-commerce") service providers generate and maintain web page storefronts that provide efficient systems and processes for presenting products (goods and services) to page viewers and users for consideration for purchase. Viewers may be provided with a wide variety of information useful in deciding whether or not to purchase a good or services, including visual depictions of goods and services offered, selectable options (color, size, variable scope of services provided, etc.), performance metrics for each selectable option (speed or power or weight of goods, geographic area or dimensions of scope of service coverage, etc.), shipping options (carrier, date of delivery), and itemized and total costs for purchase of the product, including as dynamically calculated in response to option selections.

Product images provided by E-commerce sites may include photos and graphic illustrations of products that are professionally created and edited to feature or maximize attributes of the product that are determined to be likely appealing to a viewer of the site as potential consumer. Models may be depicted within such visual presentations, chosen and depicted as a function of having or presenting physical attributes or notoriety deemed to be beneficial in marketing the associated product to viewing consumers. For example, models with body shapes presenting toned muscles or otherwise conveying a physically fit appearance may be selected to wear athletic apparel products such as clothing, sports headphones, fitness equipment accessories, etc., in order to display the products in a form as typically presented by consumers likely to wear the goods, or in a form that a consumer of the product hopes to convey if they were to purchase and wear the same product. A celebrity or other person famous for success in some arena of endeavor may also endorse an offered product, wherein such endorsements may impart additional perceived value to the product.

BRIEF SUMMARY

In one aspect of the present invention, a computerized method for automated modeling of products with user social network contacts includes executing steps on a computer processor. Thus, in response to a user selecting via a graphical user interface input a product that is offered in a graphic display device view of an electronic commerce web site, a computer processor searches a social network service for pictures that visually depict social network connections of the user in association with the selected product. The processor thus refreshes the graphic display device to display an information page of the electronic commerce web site that provides information regarding the selected product, and an inset picture that depicts a social network connection of the user in association with the selected product, wherein the inset picture is returned in satisfaction of the searching of the social network connections of the user.

In another aspect, a system has a hardware processor in circuit communication with a computer readable memory and a computer-readable storage medium having program instructions stored thereon. The processor executes the program instructions stored on the computer-readable storage medium via the computer readable memory and thereby, in response to a user selecting via a graphical user interface input a product that is offered in a graphic display device view of an electronic commerce web site, searches a social network service for pictures that visually depict social network connections of the user in association with the selected product. The processor thus refreshes the graphic display device to display an information page of the electronic commerce web site that provides information regarding the selected product, and an inset picture that depicts a social network connection of the user in association with the selected product, wherein the inset picture is returned in satisfaction of the searching of the social network connections of the user.

In another aspect, a computer program product for automated modeling of products with user social network contacts has a computer-readable storage medium with computer readable program code embodied therewith. The computer readable hardware medium is not a transitory signal per se. The computer readable program code includes instructions for execution which cause the processor to, in response to a user selecting via a graphical user interface input a product that is offered in a graphic display device view of an electronic commerce web site, search a social network service for pictures that visually depict social network connections of the user in association with the selected product. The processor thus refreshes the graphic display device to display an information page of the electronic commerce web site that provides information regarding the selected product, and an inset picture that depicts a social network connection of the user in association with the selected product, wherein the inset picture is returned in satisfaction of the searching of the social network connections of the user.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
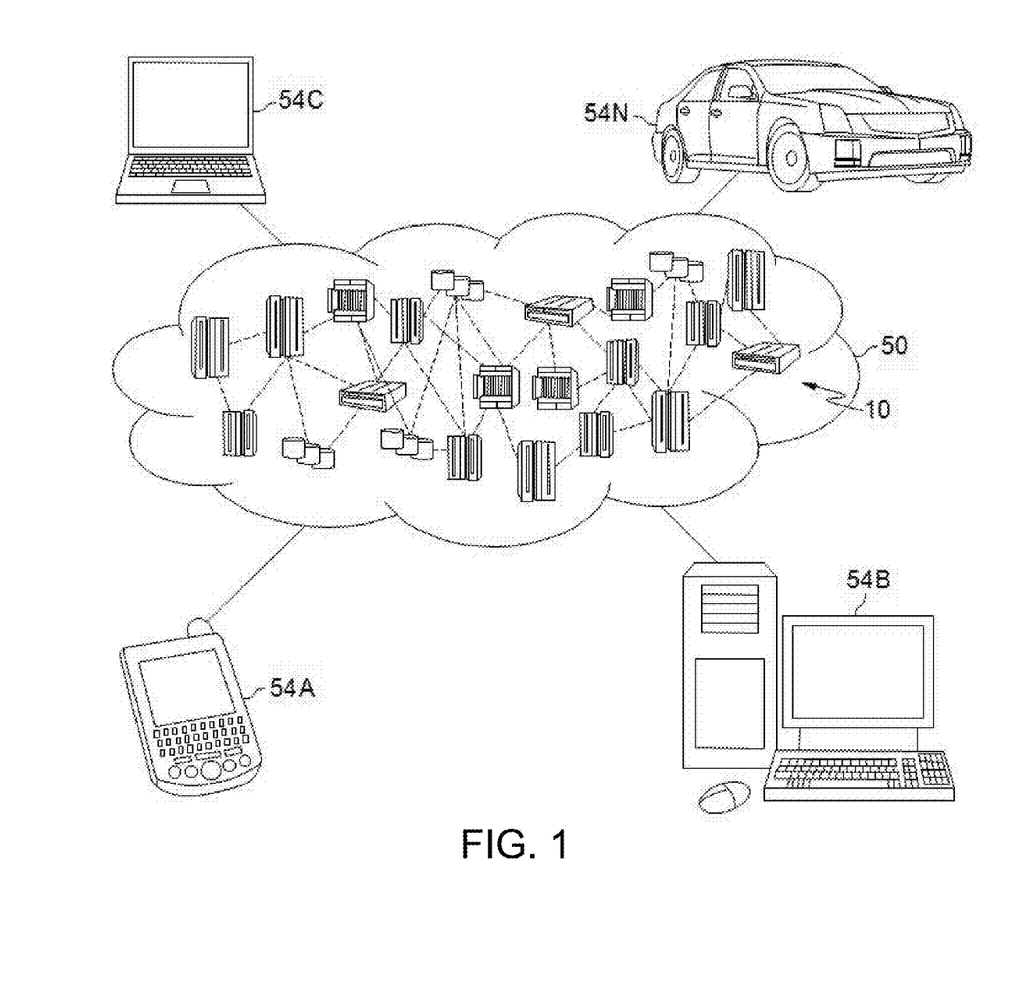
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
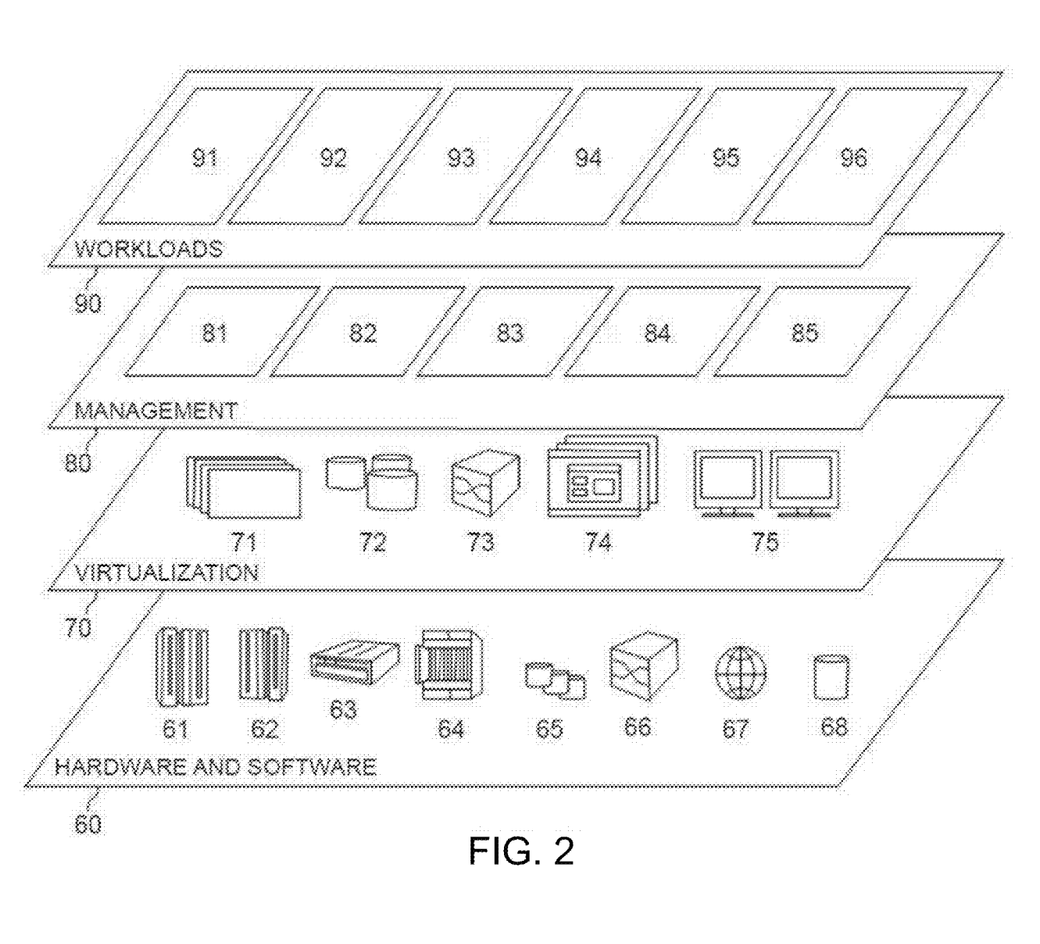
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
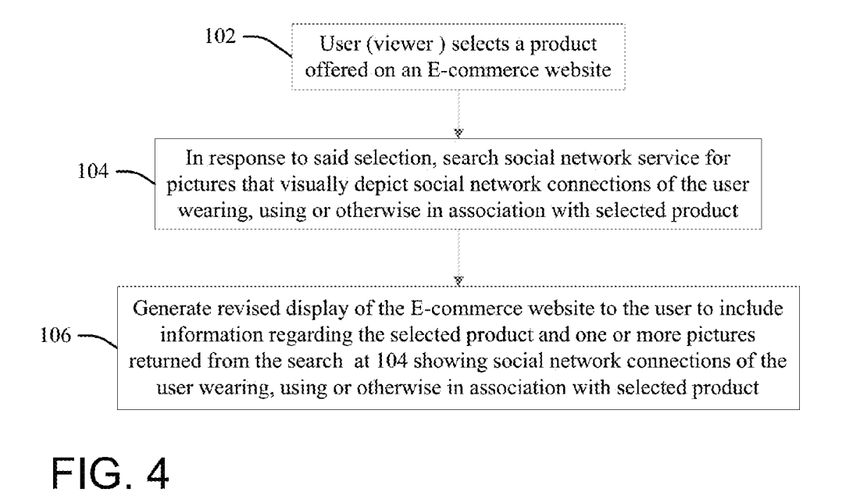
FIG. 4 is a flow chart illustration of a process or system for automated modeling of products with user social network contacts according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for automated modeling of products with user social network contacts according to embodiments as depicted in FIG. 4 as described below.

Figure 3:
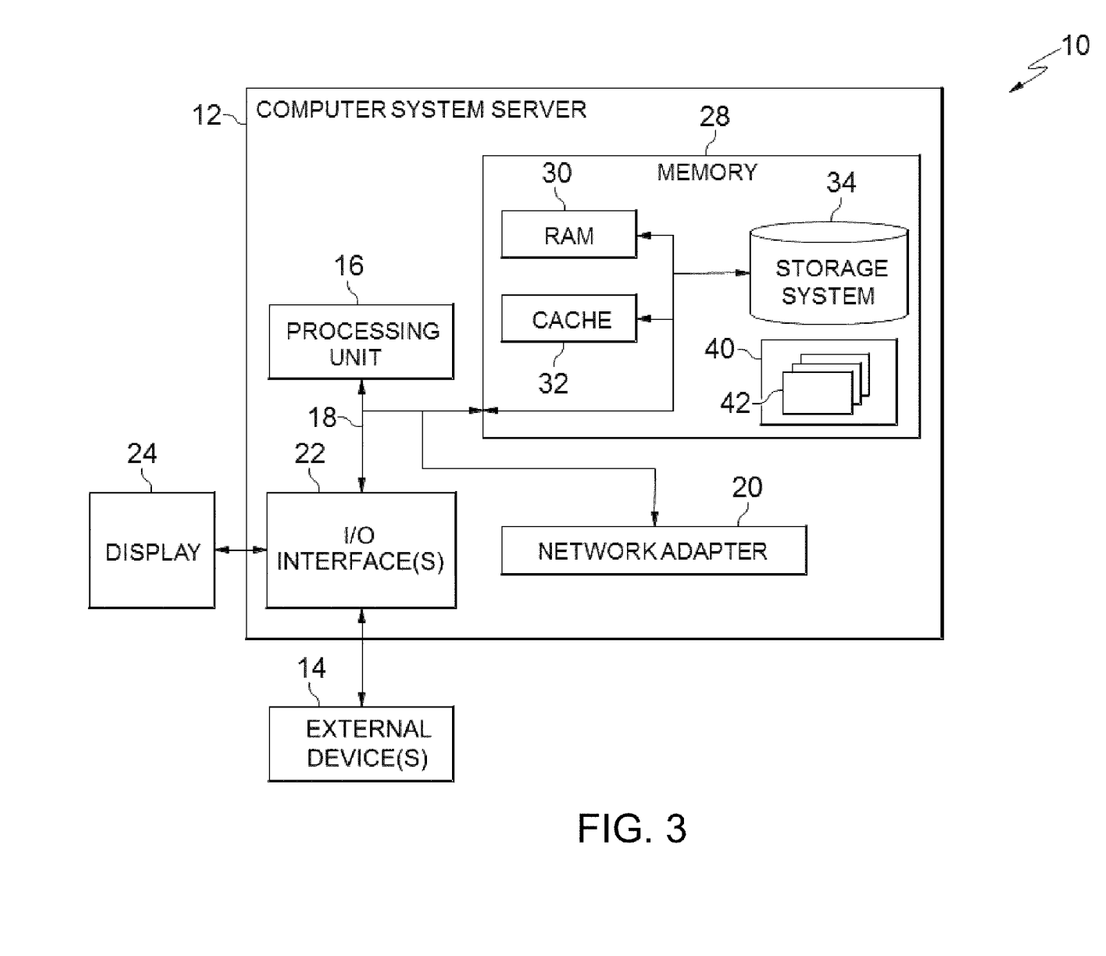
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for automated modeling of products with user social network contacts. At 102, a user (viewer) of an E-commerce site selects a product that is offered on the site (goods or services for sale, lease, rental, retention, etc.).

At 104, in response to said selection at 102, the present aspect searches a social network service for pictures (photographs, graphic illustrations generated or transformed from original photographs or video data, etc.) that visually depict social network connections of the viewer wearing, using or otherwise in association with the product selected at 102. Social network connections of the viewer include friends, relatives, business network acquaintances or colleagues, persons followed by the viewer, or other users connected to the viewer via meeting connection criteria of the social network service.

The type of association satisfied by the picture search may be defined by an attribute (type, category, nature, identification, etc.) of the product. For example, if the product identification or type or category is apparel, the requisite association may be a determination that the depicted person is wearing the product, as distinguished from other people visible within picture images that are not wearing the item. If the product is a personal sporting good item (baseball bat, sports headphones, fitness tracking wristband) the association makes a determination that the depicted person is holding, using, wearing or interacting with the item. If the product is a transportation item (bicycle, skateboard, automobile, jet ski, etc.), the association makes a determination that the depicted person is riding on or operating the transportation item. Still other examples will be apparent to one skilled in the art.

At 106 one or more of the pictures found at 104 are presented in a revised display of the E-commerce site viewed at 102, wherein the user is presented with information displayed on the E-commerce site regarding the offered product, and with the picture of the friend associated with the offered product that is returned from the search at 104.

Figure 5:
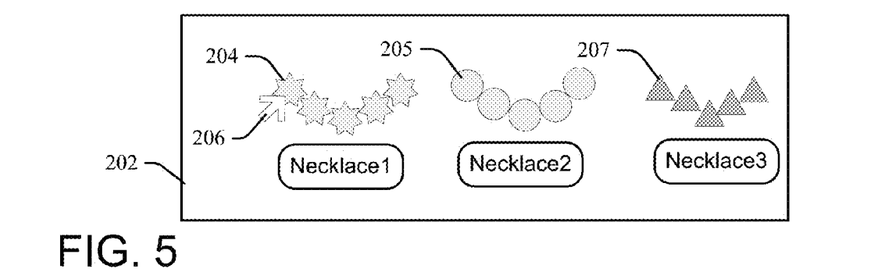
FIG. 5 is a graphic illustration of an implementation of an aspect of the present invention.
Figure 6:
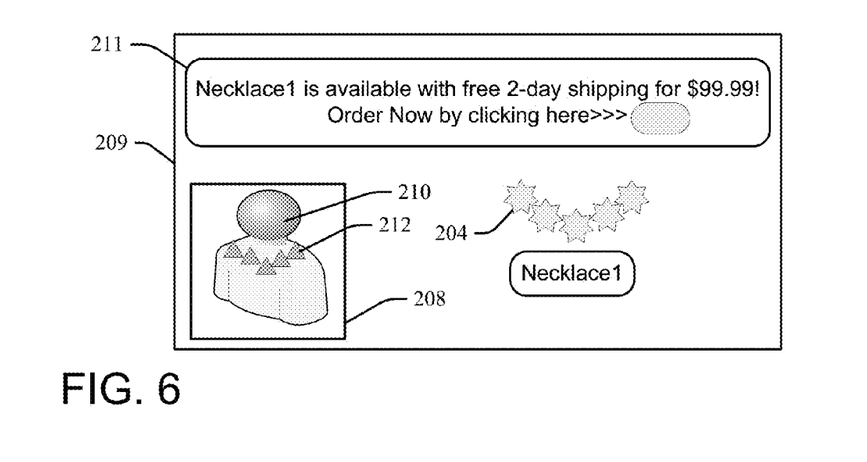
FIG. 6 is another graphic illustration of an implementation of an aspect of the present invention.

FIGS. 5 and 6 provide graphic illustrations of an example of an implementation of an aspect of the present invention. A browser window 202 shown in FIG. 5 presents an E-commerce site that offers products for sale that include three products: necklace 204 ("Necklace1"), necklace 205 ("Necklace2") and necklace 207 ("Necklace3"). In response to a selection of the necklace 204 by a viewer of the browser window 202 (via a mouse click or other graphical user interface (GUI) routine selection input while the cursor 206 is located upon the necklace 204, a voice selection command identified by natural language processing as specific to the product ("select the green necklace," etc.), a social network service for which the viewer has an account is searched for pictures that visually depict friends of the viewer as wearing the necklace 204 or a visually similar product.

Accordingly, the display of FIG. 5 is revised to the view of FIG. 6, wherein the browser is redirected to product page view 209 that displays the selected necklace 204 and a text field 211 that provides pricing and shipping information, and wherein an inset window 208 is displayed in overlay upon the product page view 209 that presents a picture of a social network service friend 210 of the viewer wearing a necklace 212 that is the selected necklace 204, or is otherwise similar to the necklace 204 pursuant to defined attribute criteria (for example, it is visually similar due to featuring the same design or combination of design elements, colored elements, element materials, etc.).

The inset window 208 or other images returned by searching social contact images may be selected and expanded or contracted in scale of view as desired by the viewing user. The inset window view 208 may also be composed by aspects of the present invention as a zoomed-in view or portion of an image that is automatically generated and returned in satisfaction of the search for pictures. For example, the inset window 208 may be a zoomed-in, detail view portion of a larger image comprising the person 210 and product 212 and composed to omit additional image information from the original picture showing other people, objects, etc.

Selection of the product 212 on the person 210 associated with the product and displayed in the view may cause a display of image information, or cause a browser or other application to retrieve additional information about the picture, such as identifying the person 210, a time and date or location of the picture, etc., or cause a browser application to navigate to a web page of the person 210 on the social network service defining the relation of the person to the viewing user, etc.

Criteria for selection of friend's pictures that is applied at 104 of FIG. 4, or used in selecting between multiple search results for the use in the inset window display 208, may be customized or otherwise defined by the user, the social network service or other service provider. Thus, the viewer may specify that only pictures displaying exact matches to the selected product be returned (thus, only pictures of the selected necklace 204 in the example of FIG. 5 above). Visual criteria may also be specified to enable the return of pictures of other similar items, such as all necklaces that have materials matching one or more of colors, finishes (glossy, matte, sparkly, etc.) material type (pearls, gemstones, metal finishes, etc.), geometric designs, product dimensions (element sizes, necklace length, weight, etc.) or other attributes defined or specified for the search. Accordingly, the search may return pictures of social network friends wearing other necklaces that appear similar to the selected necklace as to an attribute specified by the user (for example, "show me all friends wearing pearl necklaces").

Search results may also be expanded to include product variations. For example, multiple images of the product 212, or of different products having a similar type or common category criteria may be returned that each feature product views in different colors, or in the same color but using different design shapes or elements in defining the product (such as a necklace of copper metallic ovals instead of copper metallic triangles), and still other criteria will be apparent to one skilled in the art.

Returned photos may be ranked, ordered or prioritized based on a variety of distinguishing criteria including date uploaded (for example, preferring more recent images over older images). Social network connection criteria may also be specified for prioritization or satisfaction for returned picture search results. For example, picture search results may be limited to, or prioritized, as to depicting friends, relatives, or persons followed by the viewer, ranking them first over (or excluding) pictures of business network acquaintances and colleagues. Aspects may prioritize or filter the photos to favor or show those of closest friends, or friends with similar tastes or preferences, similar clothing sizes or body type or sporting interests, etc., relative to the photos of other friends.

Viewers may also request that the search results be extended to indirect social network connections of the viewer, to connections of their direct connections, thus to friends or colleagues, etc., of the user's friends. Aspects that provide such extended search capabilities may further add labels or explanatory information identifying extended contact persons depicted in the returned pictures (for example, "Jane Doe, colleague of friend Jim Smith at Big Corp.").

In some aspects a picture found from a search for contacts shown in association with the selected item may not be available for display to the viewer. For example, a photograph may have been removed by a poster. Privacy settings of an indirect or extended contact (friend of friend) may prevent display to the viewer of the picture: as the friend-of-friend is not a direct connection or friend of the user, the user may not have permission under the applicable social network rules to see their personal pictures, postings or other activity, without the explicit permission of said friend-of-friend. Thus, aspects of the present invention may substitute a stock photograph of another person in association (wearing, etc.) the selected item, or provide a text content notice of the association of the indirect social network contact to the selected product that is depicted in the specific picture (for example, "Jane Doe, colleague of friend Jim Smith at Big Corp., wears the same necklace").

Aspects address limitations and disadvantages in marketing achieved from conventional product modeling. Clothing is often worn by models chosen to meet some generic fashion standard, to ensure a picture looks perfect or to minimize distraction from the product, etc. Models chosen for depiction with products in marketing images may be chosen to satisfy expectations of a largest common majority or demographic group of potential consumers. However, some users may find the chosen models bear little resemblance to the user, or to any acquaintances of the user, and accordingly the depicting the product with such a model wearing, holding, using, or engaging in a product will not convey a credible or likely image of use of the product to the viewing user. This may impact the perceived value of the product to the viewing user, as they cannot visualize themselves or their friends actually engaging the product as marketed. Thus, conventionally modeled images may actually defeat effective marketing of the product to the viewing user.

In contrast, aspects of the present invention show to the user friends that are wearing or using the same product, in pictures displayed in addition to a modeled picture by the retailer. Recommendations from friends generally present a more credible form of advertising among consumers, relative to model depictions, celebrity endorsements and other forms of marketing. Aspects also do a better job of giving the user a real-life photographic example and sense of how the product looks in the real world, of how it looks on or with a friend or other person that the user knows (or is known to a contact of the user). Aspects leverage these advantages and also increase indirect friend recommendations by displaying the found photos in direct association with (on the same view of) E-commerce sites.

Aspects may continually scan photos of friends and other connections within a consumer's social network to identify if the connections are wearing, using, etc., products of interest to the user on a dynamic, on-going basis.

Aspects may provide users with product usage data determined for their social network contacts from the picture search results, including who and how many friends own the product, dates when friends purchased the item, etc. Such data may help a user in reducing a probability of wearing the same apparel item as another friend also attending an event. By providing insights as to what products the user's friends like, and where the friends purchased the product, the user may also determine gifting suggestions for their friends. Product association data may also be generated for contacts of the user's friends (friends-of-friends): this data may indicate a likelihood that the friend would enjoy a gift of the product, where many of the friend's contacts are found to be associated with the product in retrieved image data.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification denote the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automated modeling of products with user social network contacts, comprising executing on a computer processor:

in response to a user selecting via a graphical user interface input a product that is offered in a graphic display device view of an electronic commerce web site, determining a first visual attribute value of the selected product that is selected from the group of visual attributes consisting of color, finish, material type, geometric design, and product dimensions;

determining a type of the selected product;

searching a social network service for a plurality of pictures that each visually depict a social network connection of the user in association with a product of the same type of the selected product and having the first visual attribute value determined for the selected product, and wherein each of the plurality of pictures depict different products that have different values of another visual attribute of the group of visual attributes relative to another of the different products of the different pictures;

prioritizing the plurality of pictures as a function of different respective status criteria values of the social network connections of the user visually depicted in each of said plurality of pictures in association with respective ones of the different products, wherein the status criteria is selected from the group consisting of friend status, relative status, followed-by-the-user status, business network acquaintance status, similarity of product preferences relative to the user, similarity of clothing size relative to the user, similarity of body type relative to the user, and similarity of sporting interests relative to the user; and refreshing the graphic display device to display an information page of the electronic commerce web site that provides information regarding the selected product, and an inset picture that depicts at least a highest prioritized one of the plurality of pictures.

2. The method of claim 1, wherein the depicted associations with the products of the same type and having the first visual attribute value are selected from the group consisting of a social network contact wearing a product, a social network contact using a product, a social network contact operating a product, and a social network contact riding a product.

3. The method of claim 1, wherein the searching of the social network service searches the social network service for social network connections of the viewer that are selected from the group consisting of friends, relatives, business network acquaintances, business network colleagues, and persons followed by the viewer on the social network service.

4. The method of claim 2, further comprising:
defining a requisite association of a product of the same type and having the first visual attribute value to the social network contacts that must be satisfied by the plurality of pictures as a function of the type of the selected product, wherein the requisite association is selected from the group consisting of:
determining that the social network contact is depicted wearing a product having an apparel type of the selected product and having the first visual attribute value;
determining for a sporting good type of the selected product that the social network contact is depicted engaging a product of the same type and having the first visual attribute value in an action selected from the group consisting of holding, using, wearing or interacting with a product of the same type and having the first visual attribute value; and
determining for a transportation item type of the selected product that the social network contact is depicted riding a product of the same type and having the first visual attribute value.

5. The method of claim 2, further comprising:
extending plurality of picture search results to include depictions of indirect social network contacts in association with a product of the same type and having the first visual attribute value, wherein the indirect social network contacts are social network contacts of the social network contacts of the user but are not social network contacts of the user.

6. The method of claim 5, further comprising:
in response to determining that the user does not have permission to view a specific picture that is returned in satisfaction of the searching and that depicts an indirect social network contact of the user in association with the selected product, displaying a text content notice of the association of the indirect social network contact to the selected product that is depicted in the specific picture.

7. The method of claim 2, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the searching the social network service for the plurality of pictures, prioritizing the plurality of pictures and refreshing the graphic display device to display the information page of the electronic commerce web site and the inset picture.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
in response to a user selecting via a graphical user interface input a product that is offered in a graphic display device view of an electronic commerce web site, determines a first visual attribute value of the selected product that is selected from the group of visual attributes consisting of color, finish, material type, geometric design, and product dimensions;
determines a type of the selected product;
searches a social network service for a plurality of pictures that each visually depict a social network connection of the user in association with a product of the same type of the selected product and having the first visual attribute value determined for the selected product, and wherein each of the plurality of pictures depict different products that have different values of another visual attribute of the group of visual attributes relative to another of the different products of the different pictures;
prioritizes the plurality of pictures as a function of different respective status criteria values of the social network connections of the user visually depicted in each of said plurality of pictures in association with respective ones of the different products, wherein the status criteria is selected from the group consisting of friend status, relative status, followed-by-the-user status, business network acquaintance status, similarity of product preferences relative to the user, similarity of clothing size relative to the user, similarity of body type relative to the user, and similarity of sporting interests relative to the user; and
refreshes the graphic display device to display an information page of the electronic commerce web site that provides information regarding the selected product, and an inset picture that depicts at least a highest prioritized one of the plurality of pictures.

10. The system of claim 9, wherein the depicted associations with the products of the same type and having the first visual attribute value are selected from the group consisting of a social network contact wearing a product, a social network contact using a product, a social network contact operating a product, and a social network contact riding a product.

11. The system of claim 9, wherein the processor executes the program instructions stored on the computer-readable storage medium via the computer readable memory and thereby searches the social network service for social network connections of the viewer that are selected from the group consisting of friends, relatives, business network acquaintances, business network colleagues, and persons followed by the viewer on the social network service.

12. The system of claim 10, wherein the processor executes the program instructions stored on the computer-readable storage medium via the computer readable memory and thereby:
- defines a requisite association of a product of the same type and having the first visual attribute value to the social network contacts that must be satisfied by the plurality of pictures as a function of the type of the selected product, wherein the requisite association is selected from the group consisting of:
- determining that the social network contact is depicted wearing a product having an apparel type of the selected product and having the first visual attribute value;
- determining for a sporting good type of the selected product that the social network contact is depicted engaging a product of the same type and having the first visual attribute value in an action selected from the group consisting of holding, using, wearing or interacting with a product of the same type and having the first visual attribute value; and
- determining for a transportation item type of the selected product that the social network contact is depicted riding a product of the same type and having the first visual attribute value.

13. The system of claim 10, wherein the processor executes the program instructions stored on the computer-readable storage medium via the computer readable memory and thereby:
- extends plurality of picture search results to include depictions of indirect social network contacts in association with a product of the same type and having the first visual attribute value, wherein the indirect social network contacts are social network contacts of the social network contacts of the user but are not social network contacts of the user; and
- in response to determining that the user does not have permission to view a specific picture that is returned in satisfaction of the searching and that depicts an indirect social network contact of the user in association with the selected product, displays a text content notice of the association of the indirect social network contact to the selected product that is depicted in the specific picture.

14. A computer program product for automated modeling of products with user social network contacts, the computer program product comprising:
- a computer readable storage medium having computer readable program code embodied therewith, wherein the computer readable storage medium is not a transitory signal per se, the computer readable program code comprising instructions for execution by a processor that cause the processor to:
- in response to a user selecting via a graphical user interface input a product that is offered in a graphic display device view of an electronic commerce web site, determine a first visual attribute value of the selected product that is selected from the group of visual attributes consisting of color, finish, material type, geometric design, and product dimensions;
- determine a type of the selected product;
- search a social network service for a plurality of pictures that each visually depict a social network connection of the user in association with a product of the same type of the selected product and having the first visual attribute value determined for the selected product, and wherein each of the plurality of pictures depict different products that have different values of another visual attribute of the group of visual attributes relative to another of the different products of the different pictures;
- prioritize the plurality of pictures as a function of different respective status criteria values of the social network connections of the user visually depicted in each of said plurality of pictures in association with respective ones of the different products, wherein the status criteria is selected from the group consisting of friend status, relative status, followed-by-the-user status, business network acquaintance status, similarity of product preferences relative to the user, similarity of clothing size relative to the user, similarity of body type relative to the user, and similarity of sporting interests relative to the user; and
- refresh the graphic display device to display an information page of the electronic commerce web site that provides information regarding the selected product, and an inset picture that depicts at least a highest prioritized one of the plurality of pictures.

15. The computer program product of claim 14, wherein the depicted associations with the products of the same type and having the first visual attribute value are selected from the group consisting of a social network contact wearing a product, a social network contact using a product, a social network contact operating a product, and a social network contact riding a product.

16. The computer program product of claim 14, wherein the computer readable program code instructions for execution by the processor further cause the processor to search the social network service for social network connections of the viewer that are selected from the group consisting of friends, relatives, business network acquaintances, business network colleagues, and persons followed by the viewer on the social network service.

17. The computer program product of claim 15, wherein the computer readable program code instructions for execution by the processor further cause the processor to:
- define a requisite association of a product of the same type and having the first visual attribute value to the social network contacts that must be satisfied by the plurality of pictures as a function of the type of the selected product, wherein the requisite association is selected from the group consisting of:
- determining that the social network contact is depicted wearing a product having an apparel type of the selected product and having the first visual attribute value;
- determining for a sporting good type of the selected product that the social network contact is depicted engaging a product of the same type and having the first visual attribute value in an action selected from the group consisting of holding, using, wearing or interacting with a product of the same type and having the first visual attribute value; and
- determining for a transportation item type of the selected product that the social network contact is depicted riding a product of the same type and having the first visual attribute value.

* * * * *